US005719383A

United States Patent [19]

Forrest

[11] Patent Number: 5,719,383

[45] Date of Patent: Feb. 17, 1998

[54] TRANSACTION TERMINAL AND METHOD OF MAINTAINING ACCEPTABLE OPERATION OF THE TRANSACTION TERMINAL

[75] Inventor: Simon J. Forrest, Dundee, Scotland

[73] Assignee: NCR Corporation, Dayton, Ohio

[21] Appl. No.: 754,333

[22] Filed: Dec. 22, 1996

Related U.S. Application Data

[63] Continuation of Ser. No. 450,655, May 25, 1995, abandoned.

[30] Foreign Application Priority Data

Dec. 29, 1994 [GB] United Kingdom .................... 9426341

[51] Int. Cl.$^6$ ........................ G06F 17/60

[52] U.S. Cl. ................ 235/379; 235/380; 902/17; 271/11; 364/183; 165/80.3; 236/44 C; 209/534

[58] Field of Search ................ 235/379, 380; 902/7, 17; 271/258.01, 265.01, 265.02, 270, 11, 202; 364/183, 474.12; 62/259.2; 165/80.3; 236/44 C; 209/551

[56] References Cited

U.S. PATENT DOCUMENTS

| | | | |
|---|---|---|---|
| 3,937,925 | 2/1976 | Boothroyd | 235/379 |
| 4,413,738 | 11/1983 | Pemberton et al. | 209/523 |
| 4,589,712 | 5/1986 | Hastings | 312/236 |
| 4,660,168 | 4/1987 | Grant et al. | 235/379 |
| 4,694,963 | 9/1987 | Takesako | 235/379 X |
| 4,772,781 | 9/1988 | Watanabe | 235/379 |
| 4,813,475 | 3/1989 | Couvrette | 165/21 |
| 4,885,676 | 12/1989 | Zweighaft | 364/183 X |
| 4,928,230 | 5/1990 | Kawamura et al. | 235/379 X |
| 4,992,647 | 2/1991 | Konishi et al. | 235/379 |
| 5,019,249 | 5/1991 | Sugai et al. | 235/379 X |
| 5,064,999 | 11/1991 | Okamoto et al. | 235/379 |
| 5,105,229 | 4/1992 | Ozaki | 271/258.01 X |
| 5,180,156 | 1/1993 | Matsui et al. | 271/11 X |
| 5,253,167 | 10/1993 | Yoshida et al. | 235/379 X |
| 5,301,131 | 4/1994 | Kim | 264/183 X |
| 5,359,285 | 10/1994 | Hashinaga et al. | 165/80.3 X |
| 5,386,104 | 1/1995 | Sime | 235/379 |
| 5,389,773 | 2/1995 | Coutts et al. | 235/379 |
| 5,452,962 | 9/1995 | Zillner | 236/44 C X |
| 5,468,941 | 11/1995 | Sasaki | 235/379 |

FOREIGN PATENT DOCUMENTS

| | | |
|---|---|---|
| 2590704 | 5/1987 | France . |
| 61-208516 | 9/1986 | Japan . |
| 2114549 | 8/1983 | United Kingdom . |
| 2269205 | 2/1994 | United Kingdom . |
| 8202962 | 9/1982 | WIPO . |

OTHER PUBLICATIONS

IBM Technical Disclosure Bulletin, vol. 31, No. 6, Nov. 1988, New York, US, pp. 395–396, Anonymous: "Energy Storage with On-Demand Release to Selectively Warm Localized Areas of a Machine Exposed to Outdoor Temperature".

IBM Technical Disclosure Bulletin, vol. 29, No. 10, Mar. 1987, New York, US, pp. 4583–4584, Anonymous: "ATM Retrieval of Unclaimed Cash Issue".

*Primary Examiner*—Donald T. Hajec
*Assistant Examiner*—Michael G. Lee
*Attorney, Agent, or Firm*—Michael Chan

[57] ABSTRACT

A transaction terminal (2) which incorporates a control unit (4) for controlling the operation of the terminal. Terminal operation is monitored by a plurality of sensors (110–116) in communication with the control unit (4). The control unit (4) can access data characteristic of predetermined acceptable terminal operation and the outputs of the sensors (110–116) are compared with said data. The control means (4) is adapted to alter terminal operation in dependence on the output of the sensors (110–116) so as to compensate for any variation from the acceptable terminal operation. The sensors (110–116) also include additional sensors (118,120) arranged to monitor ambient environmental conditions, and the control unit (4) is arranged to alter terminal operation dependent on changes in the ambient environmental conditions as detected by the additional sensors (118,120).

4 Claims, 4 Drawing Sheets

TRANSACTION TERMINAL AND METHOD OF MAINTAINING ACCEPTABLE OPERATION OF THE TRANSACTION TERMINAL

This is a continuation of application Ser. No. 08/450,655 filed on May 25, 1995 now abandoned.

BACKGROUND OF THE INVENTION

The invention relates to a transaction terminal, and has application for example to an automated teller machine (ATM).

One function of an ATM is to dispense bank notes to a user. With some ATMs the user can also deposit documents or envelopes containing bank notes and obtain financial information. A standard ATM having the facility to dispense bank notes includes electronic control means connected to both a currency dispenser unit and a user interface device. As is well known, in operation of such an ATM a user inserts a user identity card into the machine and then enters certain data, such as a personal identification number (PIN) and the quantity of currency required to be dispensed, by means of a key pad incorporated in the user interface device. The ATM will then process the requested transaction, dispense notes extracted from one or more storage cassettes within the currency dispenser unit, update the user's account to reflect the transaction and return the card to the user as part of a routine operation.

In order to dispense cash to a user, bank notes held in one or more of the storage cassettes in the cash dispenser unit of the ATM are extracted by pick means and fed one by one to stacking means from where they are fed to an output slot in the ATM. The feed means for feeding notes to and from the stacking means typically include arrays of rubber rollers and/or endless belts. Documents and envelopes deposited in the ATM may be conveyed to a deposit storage bin.

One form of pick means commonly used in ATMs includes pivotably mounted pick arms provided with rubber suction pads and connected to an air pump means. In operation, a bank note is picked out of an associated storage cassette by a pair of pick arms and moved into engagement with the note feed means.

In operation of an ATM, various malfunctions may occur from time to time. For example, bank notes may become jammed in the feed path, the pick means may fail to pick a bank note from the associated storage cassette, or there may occur multiple feeding in which two or more notes are fed in superposed relationship to the stacking means.

The problems discussed above may be caused by wear of components in the dispenser unit or by changes in the ambient conditions in the vicinity of the ATM. For example, if the ambient temperature is low the rubber suction pads and the feed rollers and belts will be less resilient and will grip the notes less securely. This may result in the suction pads failing to form a vacuum seal with a note and consequently failing to pick the note, or in the feed means slipping with respect to each of the notes and causing bunching which may result in the notes becoming jammed or giving rise to multiple or gulp feeding.

When ATM malfunctions, such as those discussed above, occur the ATM may be shut down until the malfunction is rectified, which will require the intervention of a trained operator, or in the event of multiple feeding the picked notes will be diverted to a purge bin resulting in less efficient operation of the ATM.

SUMMARY OF THE INVENTION

It is an object of the present invention to alleviate the problems discussed above and to enhance terminal operation.

According to the present invention there is provided a transaction terminal including control means for controlling the operation of said terminal, and a plurality of sensors in communication with said control means and arranged to monitor the operation of said terminal, characterized in that said control means has stored therein data characteristic of predetermined acceptable terminal operation, and is arranged to compare the outputs of said sensors with said data, said control means being arranged to alter terminal operation in response to said outputs in order to maintain said acceptable terminal operation.

An advantage of the present invention is that the terminal can alter its operation in order to compensate for wear of components and changes in ambient conditions, and thereby reduce the likelihood of terminal malfunctions occurring. The terminal may also be controlled so as to rectify malfunctions without the need for intervention by an operator, thereby reducing the downtime of the terminal, i.e. the time for which the terminal is out of service.

BRIEF DESCRIPTION OF THE DRAWINGS

An embodiment of the present invention will now be described, by way of example, with reference to the accompanying drawings, in which.

DETAILED DESCRIPTION OF PREFERRED EMBODIMENTS

Figure 1:
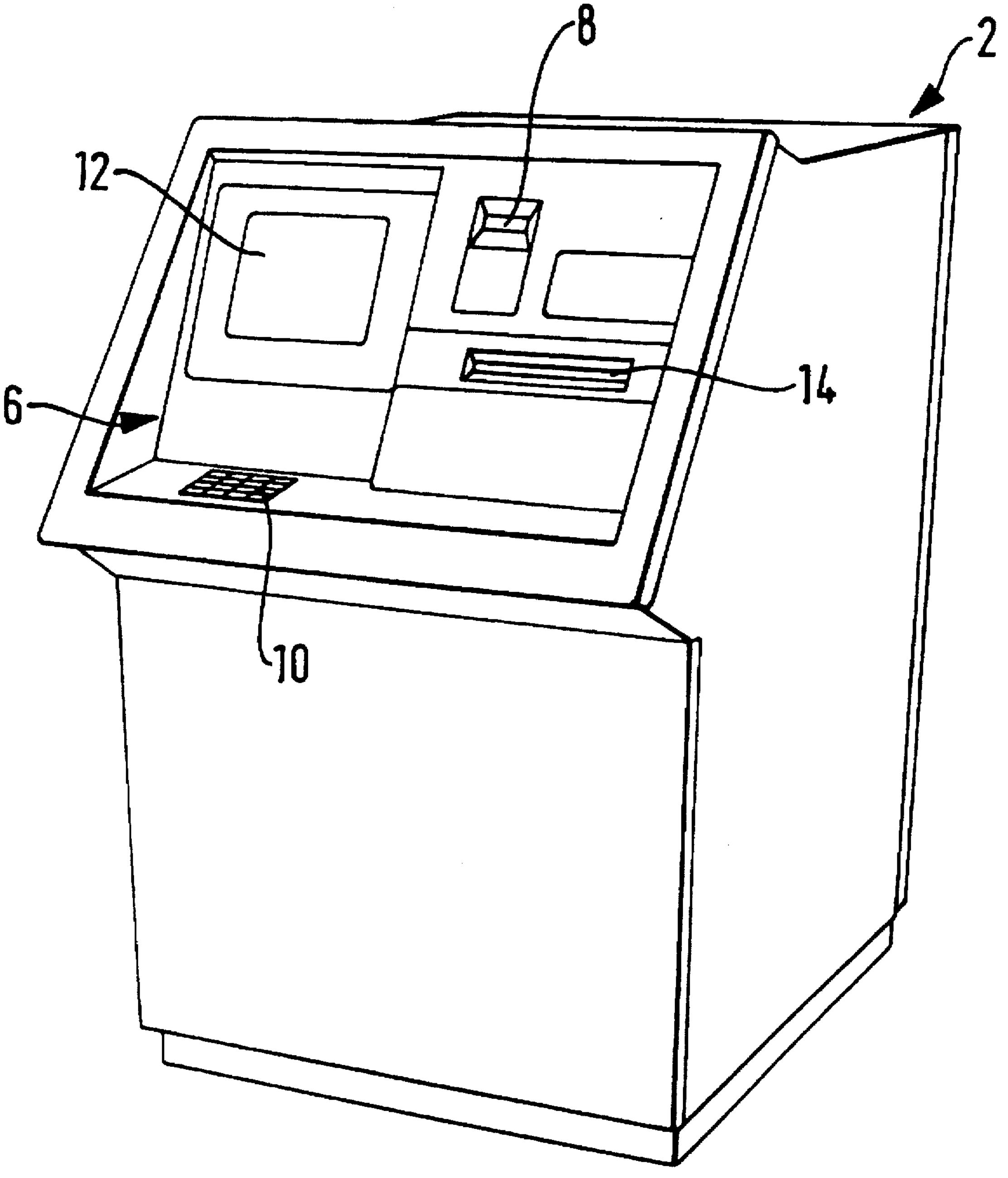
FIG. 1 is a perspective view of an ATM in accordance with the present invention.
Figure 4:
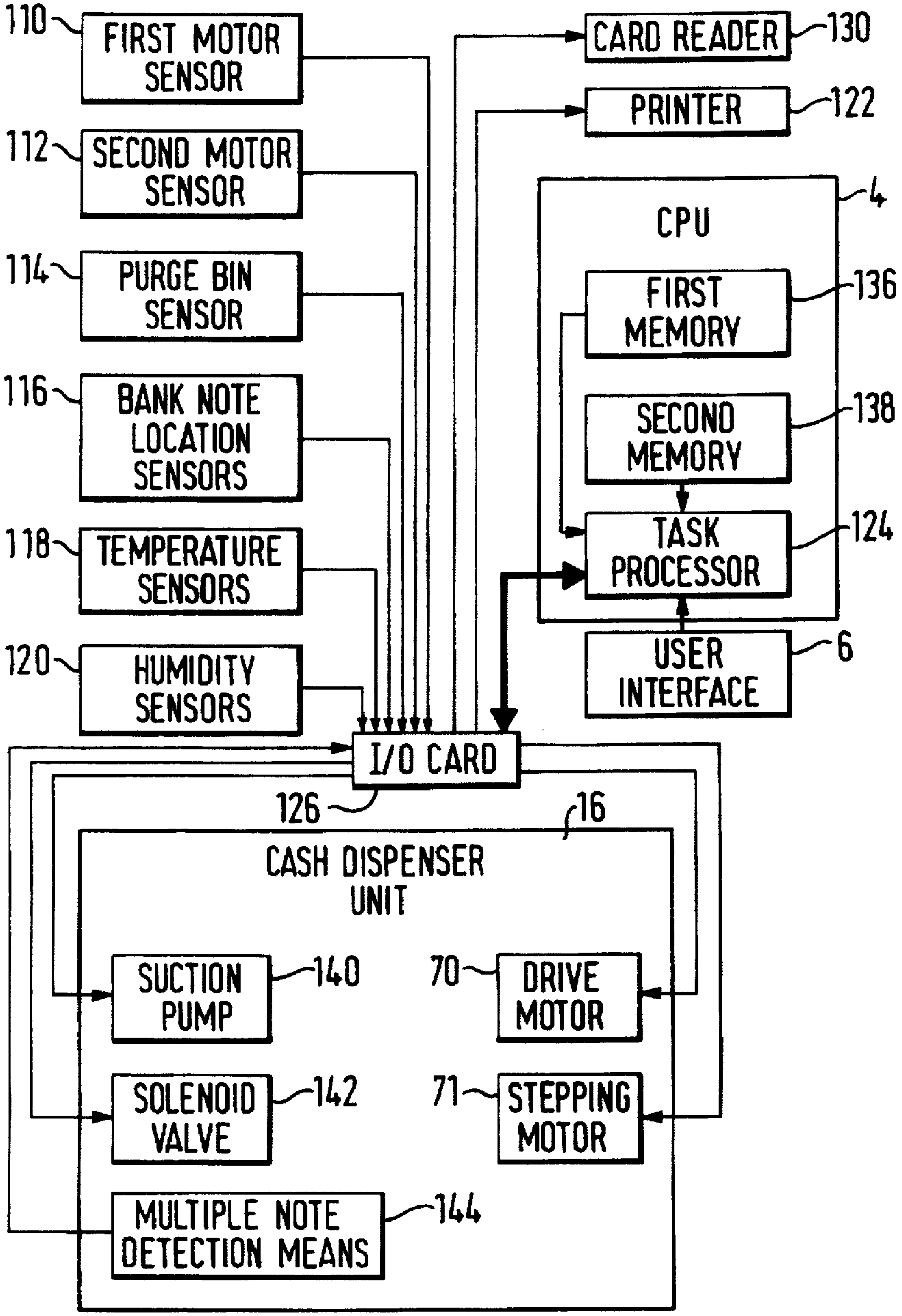
FIG. 4 is a block circuit diagram of the ATM of FIG. 1.

With reference to FIGS. 1 and 4 there is illustrated an ATM 2 in accordance with the present invention, which includes a control means in the form of a central processor unit (CPU) 4 which has stored therein a control program which controls the operation of the ATM 2 in dependence upon information gained from a plurality of sensors 110–120. If sensors are added or removed from the terminal 2 the program may be updated. The program monitors and optimises the operation of the ATM 2.

The CPU 4 is connected to a user interface device 6 incorporating a slot 8 (FIG. 1), connected to a conventional card reader 130 (FIG. 4), for receiving a user identity card, a key pad 10 for inputting data, a screen 12 for displaying user information, and an output slot 14 for dispensing bank notes to a user. The CPU 4 is also connected to a cash dispenser unit 16 (FIG. 2) and a conventional printer 122 (FIG. 4) for printing documents such as statements, receipts and account balances.

Figure 2:
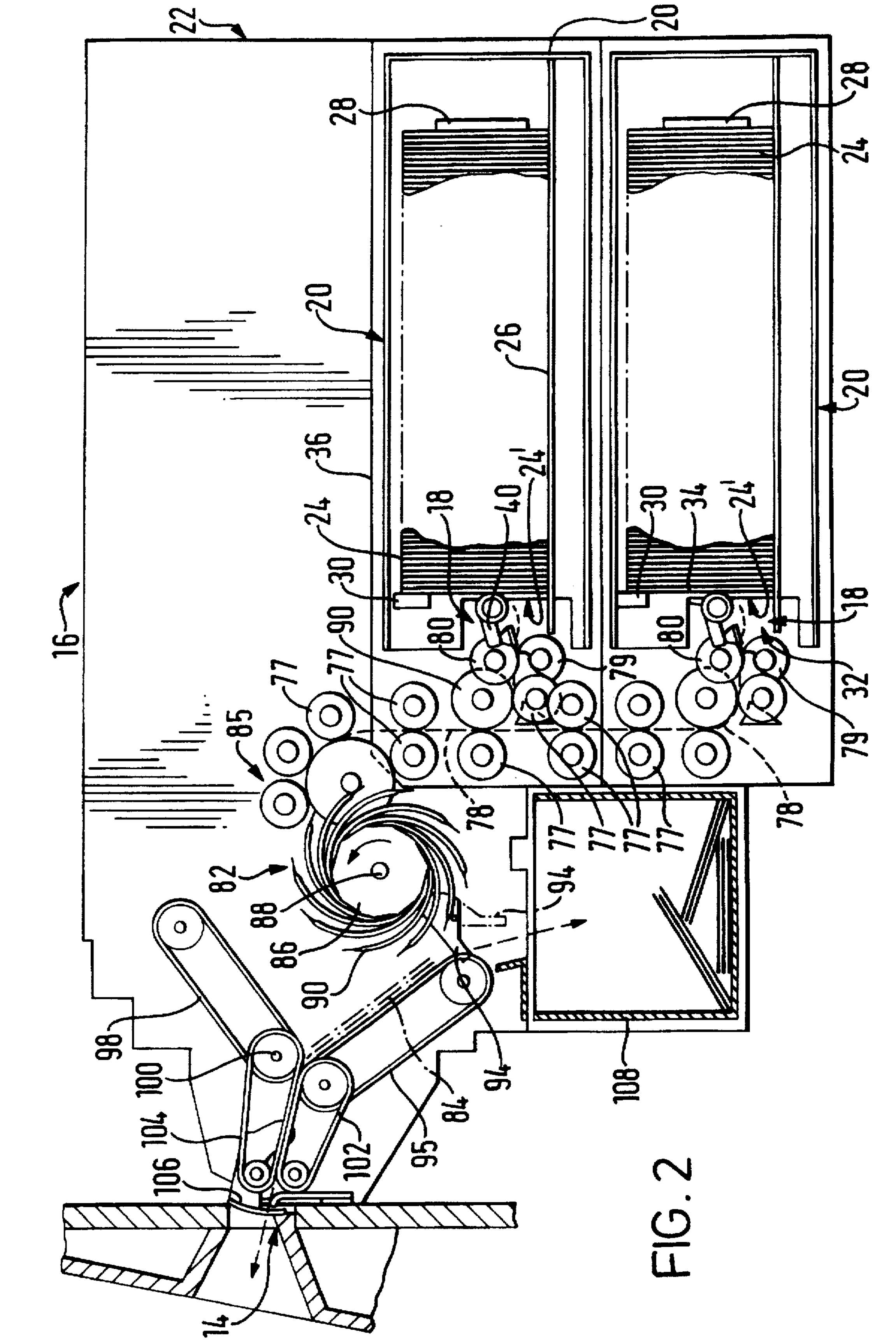
FIG. 2 is a side elevational view of a cash dispenser unit of the ATM of FIG. 1, the dispenser unit having two pick means, and parts of said unit being omitted.
Figure 3:
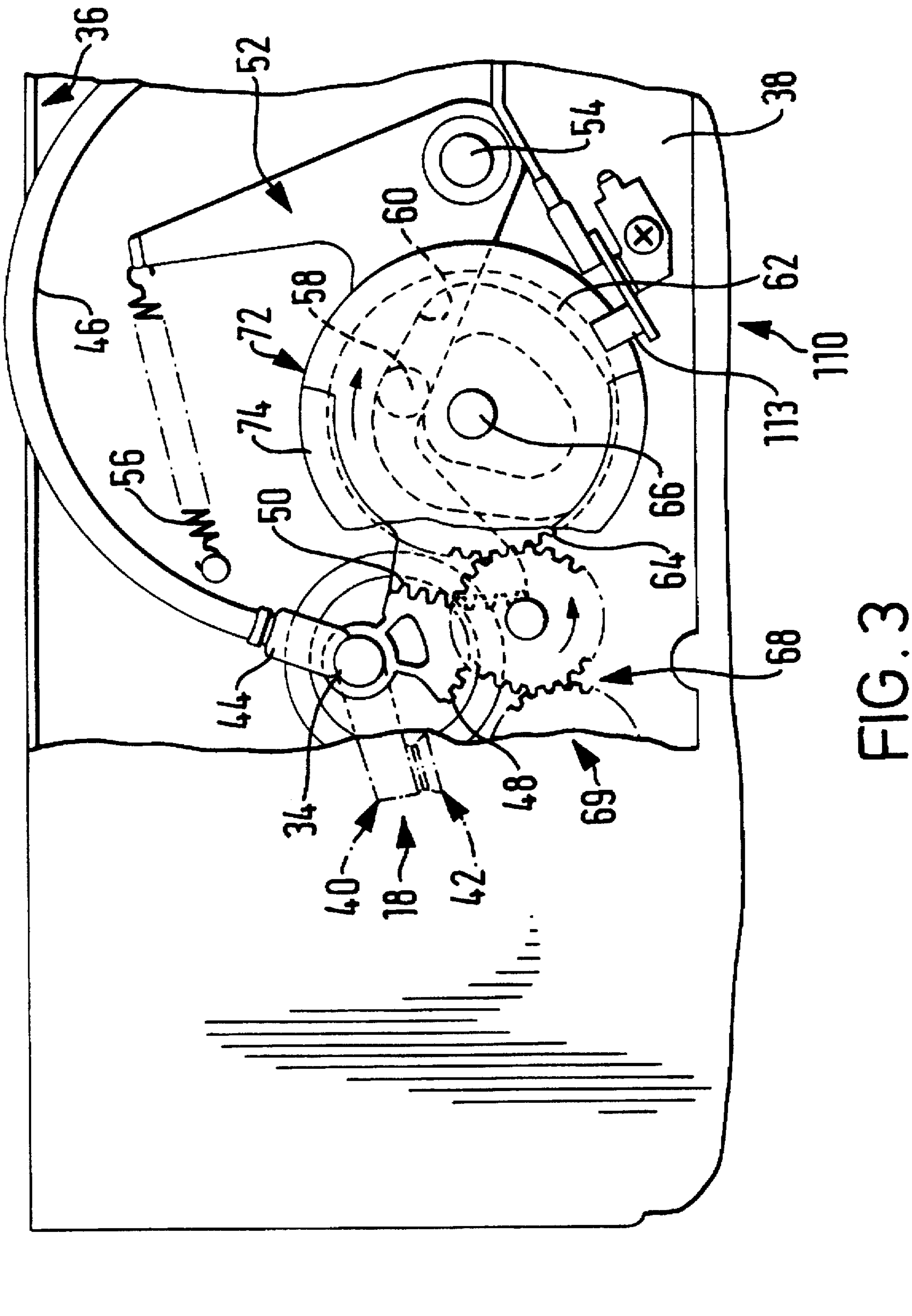
FIG. 3 is an enlarged side elevational view of one of the pick means of FIG. 2.

Referring particularly to FIGS. 2 and 3, the cash dispenser unit 16 includes two similar pick means 18 arranged one above the other and respectively associated with two storage cassettes 20 which are removably mounted in a supporting framework 22 of the dispenser unit 16. Each of the storage cassettes 20 is arranged to contain a stack of bank notes 24, corresponding long edges of which are supported on a horizontal support plate 26 mounted in the storage cassette 20. The stack of notes 24 in each storage cassette 20 is urged by a spring loaded pusher member 28 towards a stop member 30 mounted at the front end of each storage cassette 20. An opening 32 is formed in the front end of each storage cassette 20, the opening 32 being closed normally by conventional shutter means (not shown) when the storage cassette 20 is not mounted in the dispenser unit 16. When a storage cassette 20 is mounted correctly in the dispenser unit 16, the shutter is automatically retracted to enable notes 24 to be extracted through the opening 32 by the associated pick means 18.

Each pick means 18 includes a tubular member 34 which extends between, and is rotatably mounted with respect to, side walls 36 and 38 (FIG. 3) of the framework 22. Two conventional pick arms 40, each incorporating a rubber suction pad 42, are secured on each tubular member 34, each pick arm 40 communicating with the interior of the associated tubular member 34. Corresponding ends of the tubular members 34 project beyond the side wall 38, and are each connected by a respective swivel elbow connector 44 to a respective rubber tube 46 via which reduced pressure is applied in operation to the respective tubular member 34. The suction force produced by the suction pump 140 (FIG. 4) is applied to a first note 24' in the stack of notes 24 in the storage cassette 20 via the tubular members 34 and suction pads 42, when the suction pads 42 are in contact with the first note 24' and a solenoid valve 142 (FIG. 4) located between the suction pump 140 and the suction pads 42 is opened.

A gear segment 48 is secured to that part of each tubular member 34 projecting beyond the side wall 38, the gear segment 48 being in co-operative engagement with a toothed end portion 50 of a first arm of a respective bell crank lever 52 which is pivotably mounted on a stud 54 secured to the outer surface of the wall 38. Each lever 52 is urged to rotate in a counter clockwise direction with reference to FIG. 3 by means of a spring 56 the ends of which are respectively attached to the side wall 38 and to the end of the second arm of the lever 52. A stud 58 is secured to one side of each lever 52, the stud 58 engaging in a cam track 60 formed in an associated cam member 62. Each cam member 62 is secured to a respective gear wheel 64 which is rotatably mounted on a respective shaft 66 projecting from the outer surface of the side wall 38. The gear wheels 64 are driven by gear wheels 68 forming part of a gear mechanism 69 operated by a main electric drive motor 70 (FIG. 4). In operation, with the drive motor 70 energised, the gear wheels 64 are rotated in a clockwise direction with reference to FIG. 3. This rotation of the gear wheels 64 brings about an oscillatory pivotal movement of the levers 52 by virtue of the engagement of the studs 58 in the cam tracks 60, the springs 56 holding the studs 58 in engagement with the inner edges of the cam tracks 60. By virtue of the engagement of the gear segments 44 with the toothed portions 50 of the levers 52, the oscillatory movement of the levers 52 brings about an oscillatory pivotal movement of the assemblies of the tubular members 34 and the associated pick arms 40. As will be explained in more detail later, the oscillatory movement of either of the assemblies of the tubular members 34 and the associated pick arms 40 is effective to cause notes 24 to be picked one by one from the stack of notes 24 held in the associated storage cassette 20.

The ATM 2 incorporates a motor sensor 110 which includes a timing disc 72 (FIG. 3) secured to the face of each gear wheel 60 remote from an associated cam member 62. The timing disc 72 is for the most part transparent but incorporates an arcuate opaque strip 74 extending around just over half the periphery of the disc 72. Each timing disc 72 is associated with optical sensing means, comprising an LED (not shown) and a co-operating photo-transistor sensor 112, which is arranged to sense the opaque strip 74. In operation, as each assembly of a gear wheel 64 and the associated cam member 62 and timing disc 72 rotates in response to energization of the drive motor 70, the associated sensor 112 generates output signals in response to the sensing of the leading and trailing edges of the associated opaque strip 74. It should be understood that the signals generated by each of the sensors 112 provide indications as to the precise positions of the associated pick arms 40 at the times when these signals are generated.

As the drive motor 70 is a variable speed motor then the speed of rotation of the drive motor 70 can be varied in order to vary the time for which the pick arms 40 hold the associated suction pads 42 in contact with a first note 24' in the stack of notes 24 in one of the storage cassettes 20, before attempting to pick the first note 24' from the storage cassette 20. If the solenoid valve 142 is opened just after the suction pads 42 are brought into contact with the first note 24' then varying the period for which the suction pads 42 are held in contact with the first note 24' will vary the suction force applied to the first note 24', as will be discussed in more detail below.

The suction force applied to the first note 24' prior to attempting to pick the first note 24' from the storage cassette 20 can also be varied by varying the delay prior to opening the solenoid valve 142 to apply the suction force to the first note 24'. As the suction pump 140 (FIG. 4) operates continuously the longer the delay prior to opening the solenoid valve 142 the larger the suction force produced by the suction pump 140 will be.

Therefore, the suction force used in picking the first note 24' can be varied by varying either the speed of rotation of the drive motor 70 or varying the delay prior to opening the solenoid valve 142.

The dispenser unit 16 also incorporates feed rollers 77 for feeding the bank notes 24 along a feed path 78 from each of the storage cassettes 20 to a stacking wheel 82 and on to the output slot 14, the rollers 77 being associated with co-operating first and second rollers 79 and 80 which are positioned at the opening 32 in the front of each storage cassette 20.

In the course of a normal pick operation the lower long edge of the first bank note 24' of the stack of notes 24 in a selected one of the storage cassettes 20 is pulled partly out of the storage cassette 20 under the suction force applied by the respective suction pads 42, and is fed between the associated first and second rollers 79,80. As the rollers 79,80 engage the bank note 24' they urge the note 24' into the feed path 78 for feeding by the rollers 77.

The stacking wheel 82 is arranged to receive notes 24 fed along the feed path 78. The stacking wheel 82 serves to stack notes 24 picked from one or both of the storage cassettes 20 so as to form a bundle 84 of notes for delivery to the output slot 14 for collection by the user.

The stacking wheel 82 is driven by the drive motor 70 and is arranged to rotate continuously in operation in a counter clockwise direction. Means (not shown) are provided between the upper transport mechanism 85 and the stacking wheel 82 for detecting any multiple feeding of notes and for detecting any invalid or torn note. The stacking plates 86 are spaced apart in parallel relationship along the stacker wheel shaft 88, each stacking plate 86 incorporating a series of curved tines 90. The tines 90 of the stacking plates 86 pass between portions of a rockably mounted stripper plate assembly 94. In operation, each note fed along the feed path 78 to the stacking wheel 82 enters between adjacent tines 90 and is carried partly around the axis of the stacking wheel 82, the note being stripped from the wheel 82 by the portions of the stripper plate assembly 94 and being stacked against belt means 95. The belt means 95 co-operates with belt means 98 normally held in the position shown in FIG. 2. When the bundle of notes 84 (or possibly a single note only) to be dispensed to a user, in response to a cash withdrawal request, has been stacked against the belt means 95, the belt means 98 is rocked in a clockwise direction about a shaft 100 so as to trap the bundle 84 of notes between the belt means 95 and the belt means 98. It should be understood that in the course of this rocking movement separate belts making up the belt means 98 pass between adjacent pairs of the stacking plates 86.

Assuming that none of the notes 24 in the bundle 84 have been rejected for any reason, the belt means 95 and 98 are operated so as to drive the bundle 84 to an adjacent pair of belt means 102 and 104. The belt means 102 and 104 serve to drive the bundle 84 through the output slot 14 to a position where the bundle 84 can be collected by the user of the ATM 2, a shutter 106, which serves to close the slot 14 when the ATM is note in operation, having previously been retracted to an open position.

It should be understood that the belt means 95 and 98 are mounted in resilient relationship relative to each other, and the belt means 102 and 104 are also mounted in resilient relationship relative to each other, so that bundles of notes of varying thickness can be held between, and fed by, the belt means 95 and 98 and the belt means 102 and 104.

The belt means 95,98,102 and 104 are driven under the control of the CPU 4 by a bi-directional stepping motor 71.

If a multiple feeding has been detected in the course of stacking the bundle of notes 84 against the belt means 95, or if one or more of the notes in the bundle 84 have been rejected for any other reason, then the stripper plate assembly 94 is rocked into the position shown in chain outline in FIG. 2, and the belt means 95 and 98 are operated to feed the bundle 84 in a direction opposite to the normal feed direction, the bundle 84 being deposited in a purge bin 108 via an opening in the top thereof. Also, if a bundle 84 of notes or a single note 24 is mis-aligned or becomes jammed between the stacking wheel 82 and the output slot 14 then the stepping motor 71 can be operated so as to cause the belt means 95,98,102 and 104 to drive the note 24 or bundle 84 of notes in the forward and the reverse direction repeatedly, in an attempt to unblock the currency jam or to realign the bank note 24 or bundle 84 of bank notes.

An ATM 2 in accordance with the present invention incorporates a plurality of sensors 110–120 (FIG. 4) in communication with the CPU 4 arranged to monitor the operation of the ATM 2 and the ambient conditions. The CPU 4 is adapted to alter the operation of the ATM 2 in dependence on the output of the sensors 110–120 so as to reduce the number of malfunctions that occur in operation. The sensors 110–120 comprise: a first motor sensor 110 located adjacent the drive motor 70 and a second motor sensor 112 located adjacent the stepping motor 71, the first motor sensor 110 including a photo-transistor sensor 113 (FIG. 3) arranged to detect the speed of the drive motor 70, and the second motor sensor 112 including a photo-transistor sensor (not shown) arranged to detect the speed and rotational direction of the stepping motor 71; a purge bin sensor 114 located adjacent the entrance to the purge bin 108 and arranged to detect the deposition of a single note 24 or a bundle 84 of notes in the purge bin 108; a plurality of optical bank note location sensors 116 located along the feed path 78 and between the stacking wheel 82 and the output slot 14 and arranged to monitor at any instant the presence or absence of notes 24 at different locations within the ATM 2; a plurality of temperature sensors 118 located within the ATM 2, providing the CPU 4 with an accurate measure of the temperatures at selected locations throughout the ATM 2; and a plurality of humidity sensors 120 also located within the ATM 2 so as to provide the CPU 4 with an accurate measure of the ambient humidity at selected locations throughout the ATM 2.

When the ATM 2 is operating, the sensors 110–120 continually monitor the operation of the ATM 2 and ambient conditions and communicate the information obtained to the CPU 4. For example, the temperature sensors 118 may detect that the ambient temperature within the ATM 2 is lower than a predetermined temperature. On receipt of this information the CPU 4 will bring about one or more of a number of actions in order to reduce the likelihood of a malfunction occurring. Thus, for example the CPU 4 may reduce the speed of the drive motor 70 which drives the rollers 77, 79, 80 thereby reducing the likelihood of slippage between a note 24 and the rollers 77, 79, 80 while the note 24 is being fed through the dispenser unit 16. As the drive motor 70 also controls the positioning of the pick arms 40, reducing the speed of the drive motor 70 will cause the rubber suction pad 42 of the pick arms 40 to be held adjacent the first note 24' in the corresponding storage cassette 20 for an increased period of time thereby increasing the suction force applied to the note 24'. The exact increase in time that the rubber suction pads 42 are held in contact with the first note 24' prior to picking will depend on the ambient temperature detected by the temperature sensors 118. The time that suction is applied by the suction pads 42 to the first note 24' is accurately monitored by the CPU 4 through the photo-transistor sensor 112, which detect the speed of rotation of the motor 70 and consequently the location of the pick arms 40 and the associated suction pads 42.

Alternatively, the CPU 4 may increase the suction force applied to the first note 24' by increasing the delay prior to opening the solenoid valve 142 to apply the suction force to the first note 24', as discussed above.

The CPU 4 obtains temperature information from each of the temperature sensors 118 which can be processed separately so that the CPU 4 can vary the operation of individual components of the ATM 2 dependent on their temperatures so as to optimize the operation of the ATM 2. For example, a temperature sensor 118 is located in each of the storage cassettes 20 and at various locations throughout the feed path 78. If the first storage cassette 20 is at a higher temperature than the second storage cassette 20 a note 24 will be picked from the second storage cassette 20 more slowly than from the first storage cassette 20 in order to compensate for the lower temperature in the second storage cassette 20. Likewise, the feed means 77 can be controlled differently in different sections of the feed path 78 in order to compensate for differences in ambient temperature detected by the temperature sensors 118 located throughout the feed means 78.

The CPU 4 also monitors by means of the sensor 114 the deposition of a note 24 or a bundle 84 of notes in the purge bin 108. If the CPU 4 finds that the rejection rate is tending to increase then the CPU 4 will cause the speed of the drive motor 70 to be reduced, which action will normally be successful in reducing the rejection rate. Under the control of the control program stored therein, the CPU 4 maintains the time taken to dispense a bundle 84 of notes as low as possible while limiting the number of times that notes 24 are rejected to a predetermined acceptable percentage of total pick operations.

A feature of the ATM 2 in accordance with the present invention is that the operating characteristics and ambient conditions of the ATM 2 are monitored and its operation is altered in dependence thereon in order to optimise its operation.

The ATM 2 is also arranged to attempt to rectify malfunctions, such as currency jams, which would normally require the intervention of an operator. For example, if a jam has occurred, depending on where the jam has occurred, the CPU 4 may cause different actions to be carried out in order to attempt to clear the jam. If the jam is located between the stacking wheel 82 and the output slot 14 the stepping motor 71 can be caused to follow a particular routine likely to succeed in freeing the jam, involving driving the belt means 94,95,102 and 104 in the forward and reverse directions as discussed above. However, if the jam is located between one of the storage cassettes 20 and the stacking wheel 82 no action can be taken to unblock the jam as the drive motor 70 is a unidirectional motor and consequently the feed means 77,79 and 80 can only be driven in one direction with respect to the feed path 78. In this case an error message is produced by the CPU 4 to inform the operator of the location of the currency jam.

Other parameters and errors may be detected by the sensors 110–120 and the above examples are presented in order to illustrate the operation of an ATM 2 in accordance with the present invention. For example, the ambient humidity, which may affect the suction force required to pick notes 24 from the stack of notes 24 in the selected storage cassette 20, is monitored through humidity sensors 120 and the ATM operation is altered as necessary in order to compensate for variations in humidity.

As with ambient temperature, humidity affects the ability of the suction means 42 to pick notes 24. If the ambient humidity is low so that the notes 24 are dry the suction pads 42 will be able to separate the first note 24' from the remaining notes 24 in the storage cassette 20 relatively easily. However, if humidity is high, the notes 24 may become moist and each may tend to stick to the adjacent note 24. Therefore, if humidity is high, the pick means 18 will require a greater suction force to pick notes 24 from the storage cassettes 20. Therefore, with high humidity, the suction pads 42 will be held in contact with the first note 24' for a longer period of time than would be the case for a low ambient humidity.

When designing an ATM 2 in accordance with the present invention an engineer will in parallel create a plurality of computer models of acceptable ATM operation. Each of the models will relate to a specific ATM function and shall comprise "objects" which define the component parts of the ATM 2 and "tasks" which define the function to be carded out by each component i.e. the range of times for which the suction pads 42 can be held in contact with a first note 24' to pick the note 24' from the storage cassette 20.

Thus the objects and their associated tasks model predetermined acceptable operation of the ATM 2, when in use.

The ATM 2 also includes an array of sensors 110–116 as discussed above, which transmit data to the task processor 124 which is characteristic of the actual operation of the ATM 2 and additional sensors 118 and 120 which monitor ambient environmental conditions. The sensors 110–120 transmit their data to the task processor 124, within the CPU 4, through an input/output (I/O) card 126 which incorporates a plurality of individual ports (not shown) assigned to each of the sensors 110–120. Additional ports on the I/O card 126 are each assigned to individual components of the ATM 2, through which the CPU 4 controls the operation of the ATM 2. The system further includes a "rule base" which is accessed when the sensors 110–116 detect a trend away from the predetermined acceptable operation of the ATM 2. The rule base defines a set of sequential steps which can be taken by the task processor 124 to determine why said trend has arisen and how, if possible, the condition which caused the trend can be rectified. For example, the task processor 124 may, in accordance with the rule base, determine that there has been a change in ambient temperature through the temperature sensors 118. The rule base would then instruct the task processor 124 to alter the speed of rotation of the motors 70 and 71 in an attempt to alleviate the problem.

When the ATM 2 is activated for use, the first of the plurality of computer models is loaded into the task processor 124 from a first memory 136 (FIG. 4) and becomes operational. The initial model which is loaded into the task processor 124 is a card reader model which models predetermined acceptable operation of the card reader 130 (FIG. 4). The model is loaded automatically when a card is input into the card slot 8 (FIG. 1) in the ATM 2. The model includes a list of initial and final settings for, and details of acceptable operation of, components of the reader 130 including: a card transport means; a transport means motor; and a reader head, as well as details of the time for which the motor must operate to pass the card under the reader head so as to read data from the card. Also, as the card is normally stored in the card reader 130 until the ATM transaction is complete, the model also includes the instruction required from the ATM 2 to cause the reader to present the card to the user.

Once the user has gained access to the ATM 2 and prior to the initial service being requested by the user an initialisation model is loaded into the task processor 124. The initialisation model includes initial settings for the movable components of the ATM 2 including the main drive motor 70, the stepping motor 71, the pick means 18, the stripper plate assembly 94 and the pivotably mounted belt means 98. When the initialisation model is loaded into the task processor 124, the task processor 124 causes each of these components or objects to become operational and to move, in their normal manner, until sensors associated with one or more of the components detect movement of the components and send a signals to the task processor 124, through the I/O card 126, thus confirming that the each of the sensors is operating correctly. The task processor 124 then instructs each of these components to move to their initial operating position, which is confirmed by the associated sensors. The ATM 2 is then ready to act upon a service request from the user.

Assuming the user requests the withdrawal of currency from the ATM 2, then the appropriate currency withdrawal model will be loaded into the task processor 124. There are two currency withdrawal models, a first model which models acceptable ATM operation when picking a note from the first storage cassette and a second model which models acceptable ATM operation when picking a note from the second storage cassette 20.

A request for an amount of currency to be dispensed will be processed by the task processor 124 into a combination of dispensing actions, picking notes for one or other of the storage cassettes 20 dependent on the amount of currency requested and the quantity and denominations of the notes in each of the storage cassettes 20. For example, if the first storage cassette 20 contains £10 notes and the second storage cassette 20 contains £20 a request for the withdrawal of £40 can be completed by picking two £20 notes or four £10 notes or one £20 note and two £10 notes. Depending on the quantity of notes in each of the storage cassettes 20 the task processor 124 will make a determination as to which of the above combinations of notes will be dispensed, and will instruct the pick means 18 to pick the appropriate number of notes from one or both of the storage cassettes 20. Each time a note 24 is picked from the first or second storage cassette 20 the appropriate first or second currency withdrawal model will be run in the task processor 124 and the actual operation of the ATM 2, determined by the sensors 110–116, will be compared with predetermined acceptable ATM operation as defined by the model. For example, if the sum is to be made up of four £10 notes taken from the first storage cassette 20 then the first currency withdrawal model will be run in the task processor 124 four times, i.e. each time a note 24 is picked, and the actual picking operation will be compared in the task processor 124 with the predetermined acceptable operation, as defined in the model.

The models can best be explained by considering the passage of a note 24 through the ATM 2. The currency withdrawal models commences with the movable components of the ATM 2 in their initial positions, as the initialisation model will have been run prior to the request for a cash withdrawal. The models each state the range of acceptable times for which the drive motor 70 can be activated in order to move the pick arms 40 so as to bring the suction pads 42 into contact with the first note 24' in the corresponding storage cassette 20, and the time for which the suction pads 42 can be held in contact with the note 24' as a vacuum force is build up to pick the note 24' from the associated storage cassette 20, as discussed above. The actual time the suction pad 42 is held against the note 24' will be determined by the task processor 124 dependent on information from the sensors 110–120, as discussed above, the time being longer if slippage of notes 24 or gulp feeds have been detected due to wear of components or low ambient temperature. The model also includes a time table for the passage of each of the picked notes 24 through sections of the feed path 78 to the stacking wheel 82 and on to the dispense slot 14, each section containing a bank note location sensor 116, the passage of each of the notes being detected by the plurality of bank note location sensors 116. Again the time taken for the passage of a note 24 is compared in the task processor 124 with the predetermined acceptable time included in the model. Again if the time taken for each of the notes 24 to pass from one section to the next tends towards the minimum or maximum allowed time, according to the model, the task processor 124 alters the speed of rotation of one or both of the motors 70 and 71 to maintain the time taken within the predetermined acceptable range, as set out in the currency withdrawal model. Also, if slippage or gulp feeding of notes 24 occurs the motor speed is altered in an attempt to alleviate the problem.

Individual notes 24 are then fed into the stacking wheel 82 forming a bundle 84 of notes prior to being presented to the user through the output slot 14 by the belt means 95,98,102 and 104, after being stripped from the stacking wheel 82 by the stripper plate assembly 94. Therefore, the model also includes a range of acceptable rotational speeds for the stepping motor 71.

Thus the entire passage of notes 24 from either of the storage cassettes 20 to the dispense slot 14 is modelled by the currency withdrawal model.

Once a note 24 or bundle 84 of notes 24 have been successfully dispensed to the user and the user has removed the notes 24 and the user identity card, the card reading model and first currency withdrawal model are down loaded by the task processor 124 to the memory 136 and the task processor 124 awaits the insertion of the next user identification card by the next user of the ATM 2.

There are also additional models which model predetermined acceptable operation of other components of the ATM 2 such as the printer 122 (FIG. 4).

When the ATM 2 is in use information regarding the success or failure of a transaction will be forwarded to the task processor 124 from the purge bin sensor 114 (FIG. 4). This information will be added to the information relating to pick success already stored in the task processor 124. If the most recent result tend towards the boundaries of the predetermined acceptable range then the task processor 124 will activate the rule base, from a second memory means 138 in the CPU 4, to determine the probable cause of the increase in the number of mis-picks. For example, ambient conditions will be monitored to see if the temperature has fallen or risen. If the temperature has fallen the rule base states that the number of mis-picks may be reduced by increasing the dispense time as described above. Therefore, the rule base may suggest that the variation between the desired operation of the ATM 2 (ratio of the mis-picks to successful transactions within the predetermined acceptable range) as defined by the currency withdrawal model and the actual operation of the ATM 2 as detected by the sensors 110–116 may be overcome by increasing dispense time by reducing the speed of rotation of the drive motor 70 or stepping motor 71. The speed of rotation of the motors 70 and 71 may be decreased incrementally as each successive request for currency from the ATM 2 is processed until the ratio of mis-picks to successful transactions in once again well within the predetermined acceptable range, while maintaining as low as possible a dispense time.

Ambient temperature, and ATM operation can continue to be monitored and ATM operation altered in dependence on fluctuations in ambient temperature. A table of optimum dispense times for given temperatures can also be stored in the task processor 124 so that the speed of rotation of the motors 70 and 71 can be set so as to optimise ATM operation.

The rule base may also be utilised when a currency jam is detected and the ATM 2 fails to dispense currency successfully. The rule base will instruct the task processor 124 to enter an "unblocking" program, in which the stepping motor 71 will be instructed to run sequentially in forward and reverse direction, as discussed above.

In conclusion an ATM 2 in accordance with the present invention can alter its operation in dependence upon information provided by a plurality of sensors 110–120 positioned throughout the ATM 2 in order to monitor ATM operation and ambient conditions. A variety of parameters may be monitored such as temperature and humidity and ATM operations; such as the speed of rotation of the drive motor 70, the speed and direction of rotation of the stepping motor 71 and the delay before opening the solenoid valve 142 can be altered in order to optimise the speed of delivery of notes 24 to a user while minimising the number of malfunctions, such as gulp feeds or note jams.

What is claimed is:

1. A transaction terminal comprising:

a bank note storage unit for storing a number of bank notes;

a currency dispenser including a picking unit for picking bank notes from the bank note storage unit during a currency dispense transaction with a customer;

a sensor for (i) sensing an ambient environmental condition, and (ii) providing a signal indicative thereof, the sensor including a temperature sensor for sensing ambient temperature; and a controller including a processor unit for (i) monitoring the signal of the sensor, and (ii) altering operation of the currency dispenser to vary the rate at which the picking unit picks bank notes from the bank note storage unit in response to the signal from the sensor;

the currency dispenser including suction means for picking bank notes from the bank note storage unit, the controller controlling the suction means to control a suction force applied to a bank note to be picked from the bank note storage unit, the suction force varying as a function of the signal from the temperature sensor indicative of ambient temperature.

2. A transaction terminal according to claim 1, wherein the controller controls the suction force by altering the time the suction means is in contact with a bank note to be picked from the bank note storage unit.

3. A transaction terminal comprising:

a bank note storage unit for storing a number of bank notes;

a currency dispenser including a picking unit for picking bank notes from the bank note storage unit during a currency dispense transaction with a customer;

a sensor for (i) sensing an ambient environmental condition, and (ii) providing a signal indicative thereof, the sensor including a humidity sensor for sensing ambient humidity; and a controller including a processor unit for (i) monitoring the signal of the sensor, and (ii) altering operation of the currency dispenser to vary the rate at which the picking unit picks bank notes from the bank note storage unit in response to the signal from the sensor;

the currency dispenser including suction means for picking bank notes from the bank note storage unit, the controller controlling the suction means to control a suction force applied to a bank note to be picked from the bank note storage unit, the suction force varying as a function of the signal from the humidity sensor indicative of ambient humidity.

4. A transaction terminal according to claim 3, wherein the controller controls the suction force by altering the time the suction means is in contact with a bank note to be picked from the bank note storage unit.

* * * * *